(12) United States Patent
Borkholder

(10) Patent No.: US 12,097,732 B2
(45) Date of Patent: Sep. 24, 2024

(54) STOWABLE STACKED HITCH RECEIVER

(71) Applicant: Gen-Y Creations, LLC, Nappanee, IN (US)

(72) Inventor: Carl J. Borkholder, Nappanee, IN (US)

(73) Assignee: Gen-Y Creations, LLC, Nappanee, IN (US)

( * ) Notice: Subject to any disclaimer, the term of this patent is extended or adjusted under 35 U.S.C. 154(b) by 752 days.

(21) Appl. No.: 17/348,826

(22) Filed: Jun. 16, 2021

(65) Prior Publication Data
US 2022/0402318 A1    Dec. 22, 2022

(51) Int. Cl.
*B60D 1/54*    (2006.01)
*B60D 1/06*    (2006.01)

(52) U.S. Cl.
CPC .............. *B60D 1/54* (2013.01); *B60D 1/065* (2013.01); *B60D 2001/544* (2013.01)

(58) Field of Classification Search
CPC . B60D 1/24; B60D 1/248; B60D 1/46; B60D 1/247; B60D 1/07; B60D 1/50; B60D 1/54; B60D 1/065; B60D 2001/544
See application file for complete search history.

(56) References Cited

U.S. PATENT DOCUMENTS

| | | | |
|---|---|---|---|
| 3,751,072 A | 8/1973 | Williams | |
| 5,884,930 A * | 3/1999 | Cluth | B60D 1/52 224/521 |
| 5,915,714 A * | 6/1999 | Bell | B60D 1/248 280/416.1 |
| 6,460,870 B2 * | 10/2002 | Moss | B60D 1/54 280/491.3 |
| 6,789,815 B2 | 9/2004 | Moss et al. | |
| 6,902,181 B1 * | 6/2005 | Dye | B60D 1/52 280/490.1 |
| 6,974,148 B2 | 12/2005 | Moss et al. | |
| 7,029,022 B2 | 4/2006 | Moss | |
| 7,338,064 B1 * | 3/2008 | Williams | B60D 1/54 280/491.1 |
| 7,819,416 B2 | 10/2010 | Moss | |
| D682,751 S * | 5/2013 | Borkholder | D12/162 |
| D683,279 S * | 5/2013 | Borkholder | D12/162 |
| D697,838 S * | 1/2014 | Borkholder | D12/162 |
| 9,321,316 B1 * | 4/2016 | Beal | B60D 1/52 |
| 9,505,281 B1 * | 11/2016 | Borkholder | B60D 1/24 |
| D797,008 S * | 9/2017 | Borkholder | D12/162 |
| 9,868,327 B1 * | 1/2018 | Borkholder | B60D 1/248 |
| D828,241 S * | 9/2018 | Borkholder | D12/162 |
| D832,749 S * | 11/2018 | McCuskey | D12/162 |
| 10,857,846 B1 * | 12/2020 | Jacobs | B60D 1/06 |

(Continued)

*Primary Examiner* — Jacob D Knutson
*Assistant Examiner* — Abigail R Hymel
(74) *Attorney, Agent, or Firm* — Sanders Pianowski LLP

(57) ABSTRACT

A stowable stacked receiver has a fixed drawbar portion that allows affixation to a towing vehicle. Attached to the fixed drawbar portion is a movable stacked receiver that can pivot between a use and a stowed position. In the use position, the stacked receivers can receive a removable drawbar in a plurality of positions, and the stacked receivers are adjacent a flat surface on the fixed drawbar portion. In the stowed position, the stacked receivers are located underneath the fixed drawbar portion. A locking pin can be used to secure the movable stacked receiver in either the use or stowed position.

25 Claims, 8 Drawing Sheets

(56) References Cited

U.S. PATENT DOCUMENTS

| | | | |
|---|---|---|---|
| 2003/0006581 A1* | 1/2003 | Moss | B60D 1/06 |
| | | | 280/515 |
| 2003/0052472 A1* | 3/2003 | Moss | B60D 1/54 |
| | | | 280/491.1 |
| 2006/0220347 A1* | 10/2006 | Witchey | B60D 1/54 |
| | | | 280/491.5 |
| 2013/0020784 A1* | 1/2013 | Weipert | B60D 1/54 |
| | | | 280/490.1 |
| 2015/0184795 A1* | 7/2015 | Babuska | B60D 1/46 |
| | | | 248/314 |
| 2016/0185170 A1* | 6/2016 | McAllister | B60D 1/248 |
| | | | 177/136 |
| 2020/0047572 A1* | 2/2020 | Fisher | B60D 1/241 |
| 2021/0086573 A1* | 3/2021 | Works | B60D 1/46 |

* cited by examiner

STOWABLE STACKED HITCH RECEIVER

BACKGROUND OF THE INVENTION

This present disclosure relates to hitches and hitch accessories that are attached to a vehicle. One of the big problems with hitches and towing is where to stow the hitch components when they are not in use. Stowing a hitch that may be dirty or greasy can be undesirable if the towing vehicle is a SUV. Further, an unsecured heavy hitch inside a passenger compartment could be a dangerous projectile in the event of an accident. For pickup trucks, stowing a hitch in the bed could result in loss from theft or damage to the bed from the hitch sliding around while driving. Leaving the hitch connected to the vehicle can create immediate and long-term problems. Immediate problems involve injury from the user walking into the hitch. Anyone that has walked into a hitch with their shin can understand. Hitches left attached to vehicles result in cuts, bruises, and/or a tripping hazard. Long-term problems include the hitch components rusting into place, making it difficult or impossible to remove from the vehicle. Others have attempted to solve this problem by creating a hitch that stows, such as U.S. Pat. Nos. 3,751,072, 6,460,870, 6,974,148, 7,029,022, and 7,819,416. Each of the aforementioned patents has a stowing feature but all suffer from complexity that can create safety and reliability problems for the user.

Stacked receiver hitches allow the user flexibility to locate the tongue of the trailer at different heights without needing to purchase multiple drawbars at different heights. The issue with stacked receivers is that they stick out from the vehicle roughly the same amount as a regular hitch, and with a hitch ball attached, the hitch sticks out is even further. A stacked receiver has the same storage problems as a regular hitch. A stowable stacked hitch is needed.

SUMMARY OF THE INVENTION

The present disclosure describes a stacked hitch assembly that has a fixed drawbar portion and stowable stacked receiver portion. The fixed drawbar portion attaches to the towing vehicle with stacked receiver portion being pivotable between a use position and a stowed position. In the use position, the stacked receiver can receive a removable drawbar in a plurality of positions. In the stowed position, the stacked receiver is located underneath the fixed drawbar portion, where it does not protrude from the towing vehicle. Depending on any interference under the vehicle, the removable drawbar may be left in or relocated to a different receiver position so it does not protrude or interfere.

DESCRIPTION OF THE PREFERRED EMBODIMENT

Figure 3:
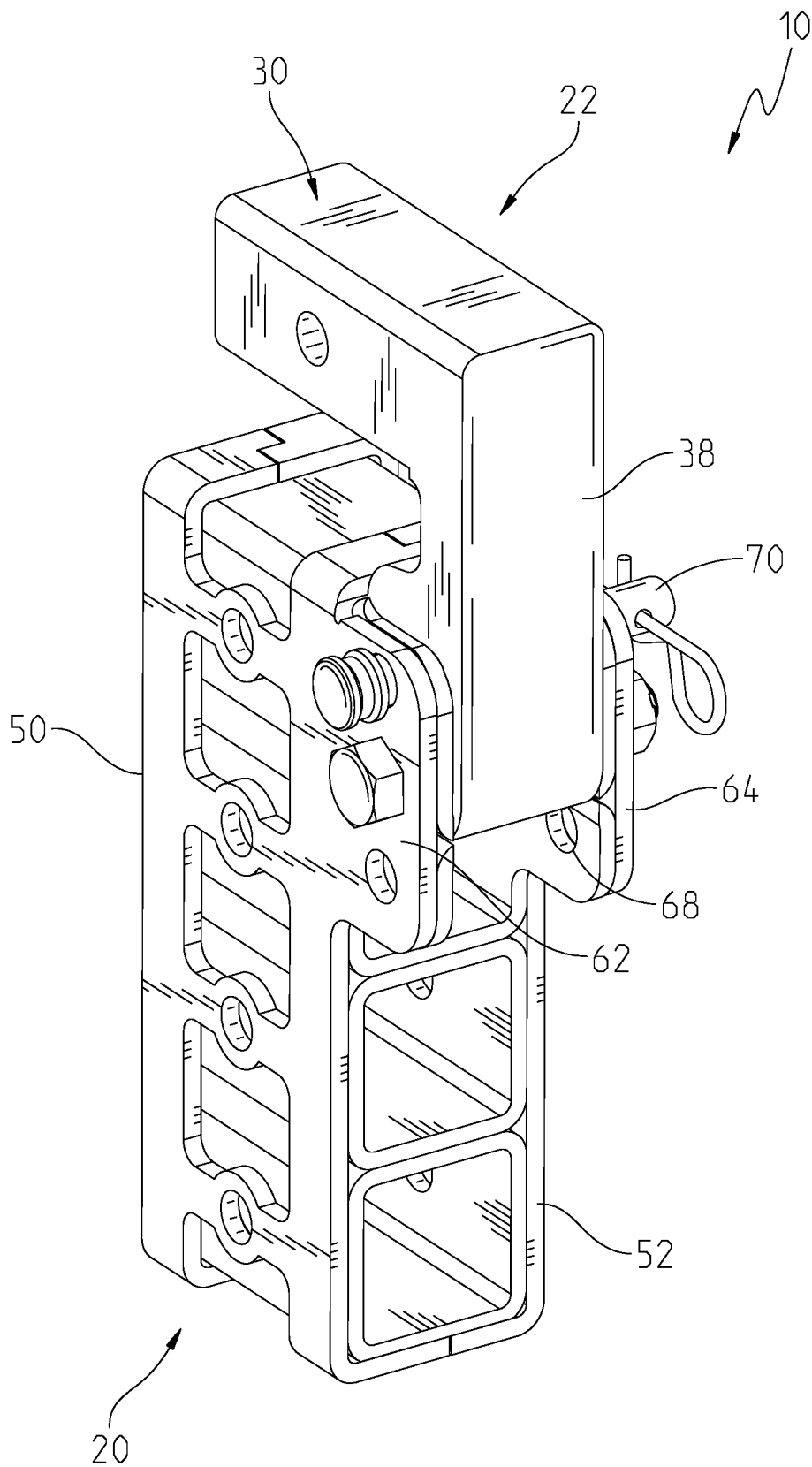
FIG. 3 is a front isometric view of the stacked hitch in FIG. 1 with the stacked receiver in the stowed position.
Figure 4:
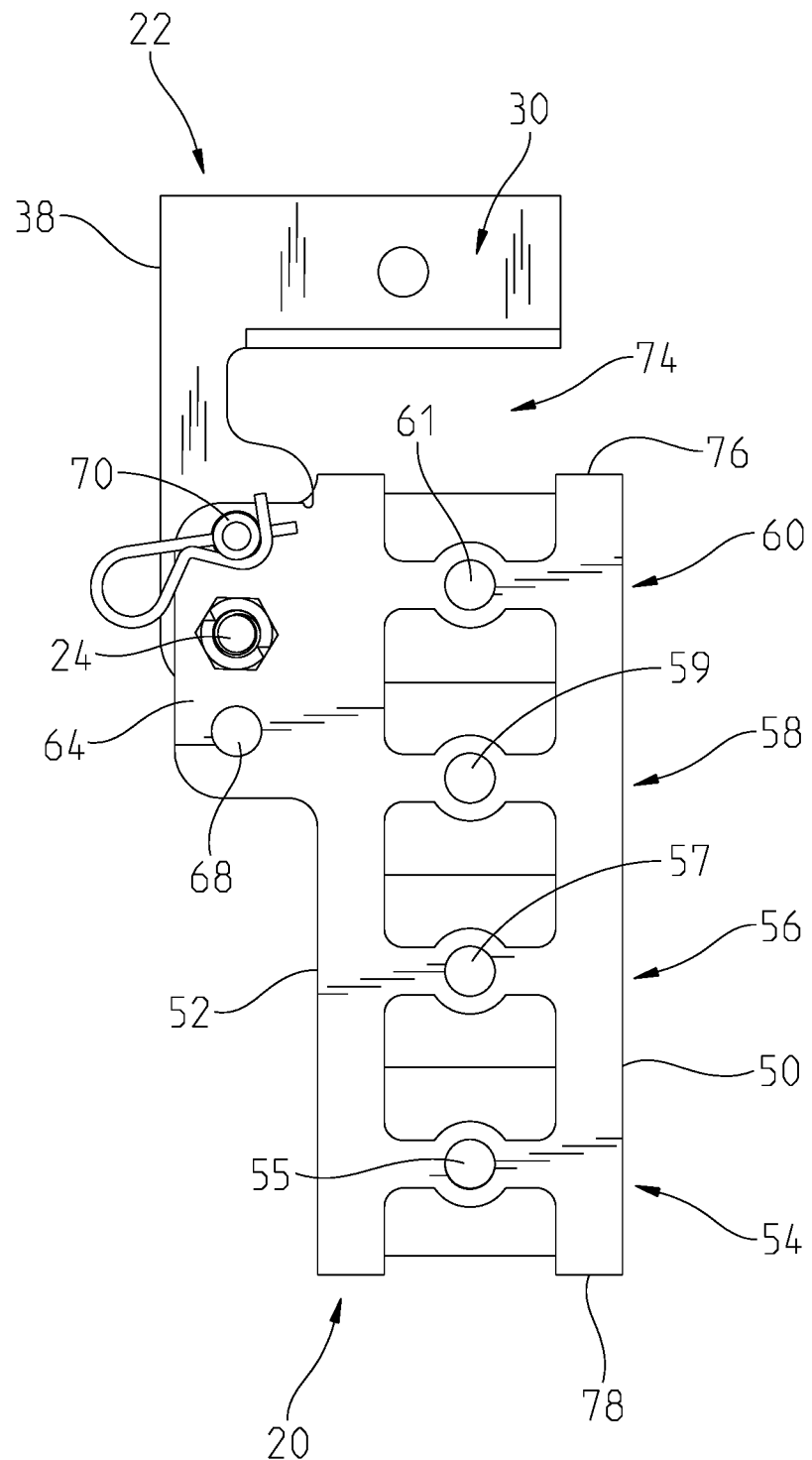
FIG. 4 is a side view of the stacked hitch in FIG. 3.
Figure 5:
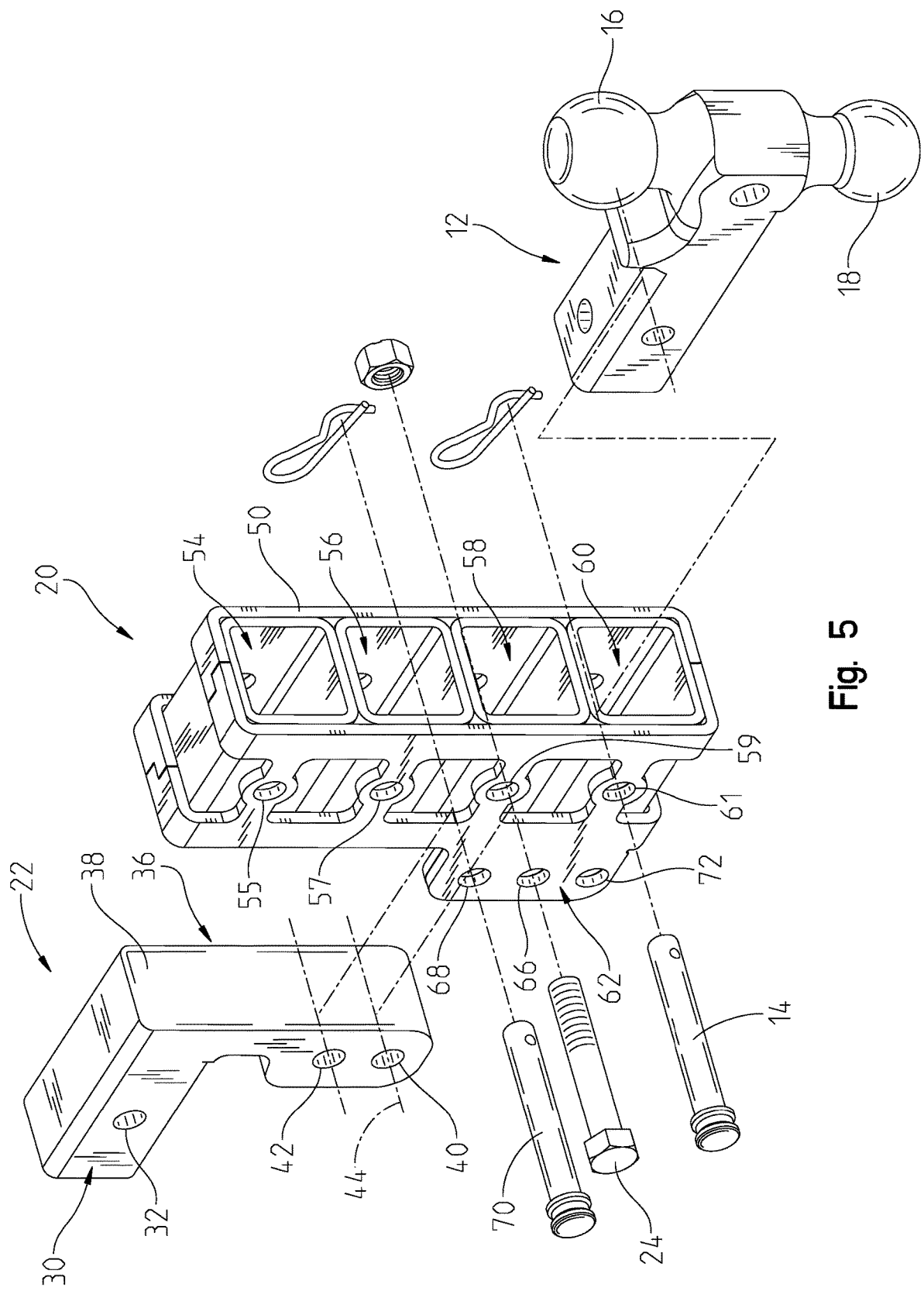
FIG. 5 is an exploded isometric view of the stacked hitch in FIG. 1.

A hideaway stacked hitch 10 is shown in FIGS. 1-8 that is used with a towing vehicle (not shown). The hitch 10 is designed to be attached to a receiver on the towing vehicle (not shown) and receive a removable drawbar 12. As shown in FIG. 5, the removable drawbar 12 is held in place by a pin 14 and can be installed at different locations on the stacked hitch 10. The removable drawbar 12 shown has two different sized hitch balls 16, 18 and is only one example. In the embodiment shown in the FIGS, the removable drawbar 12 can be installed in four different locations.

Figure 1:
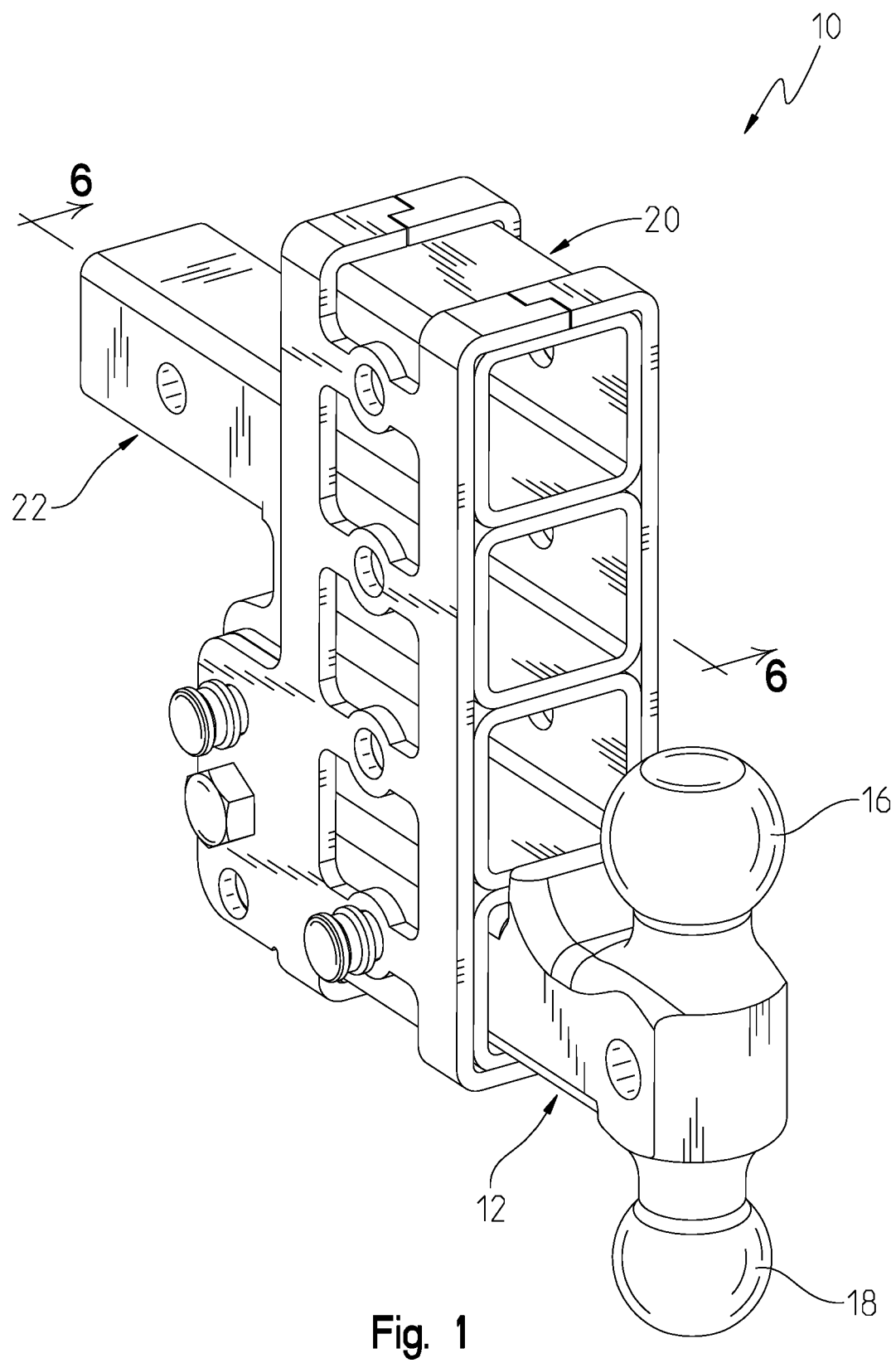
FIG. 1 is a front isometric view of the stacked hitch in the use position.
Figure 2:
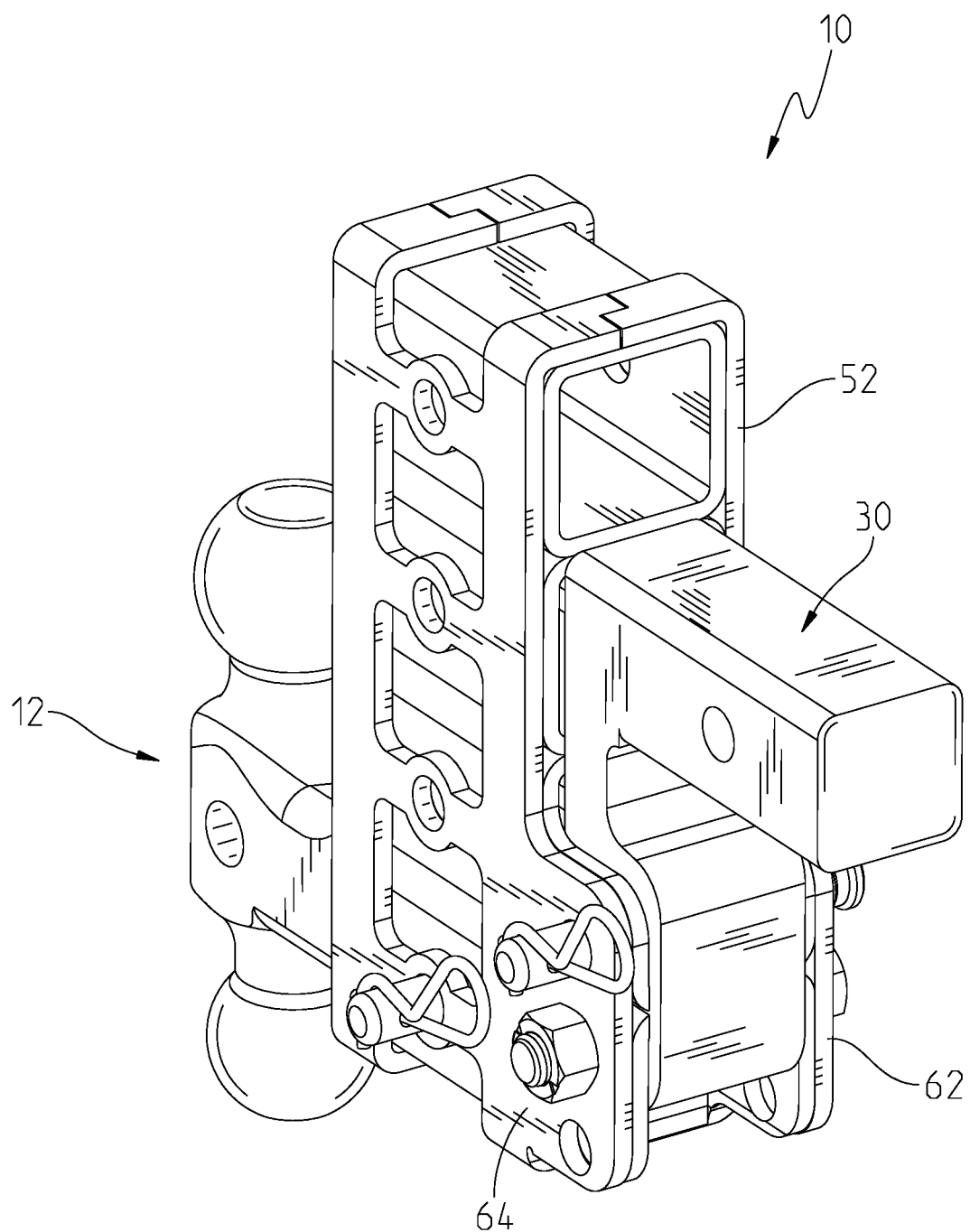
FIG. 2 is a rear isometric view of the stacked hitch in the use position.
Figure 6:
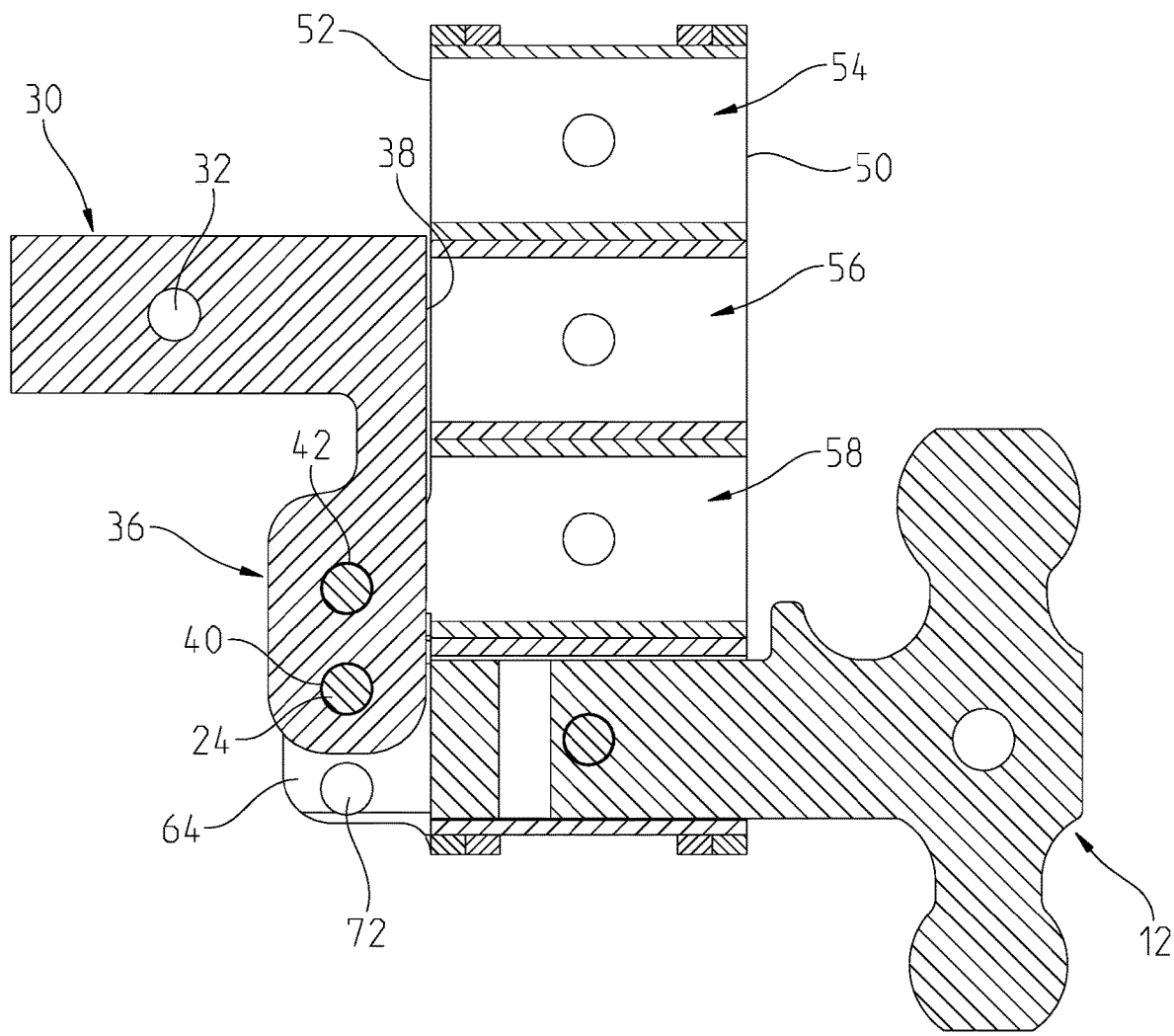
FIG. 6 is a side section view 6-6 of the stacked hitch in FIG. 1.
Figure 7:
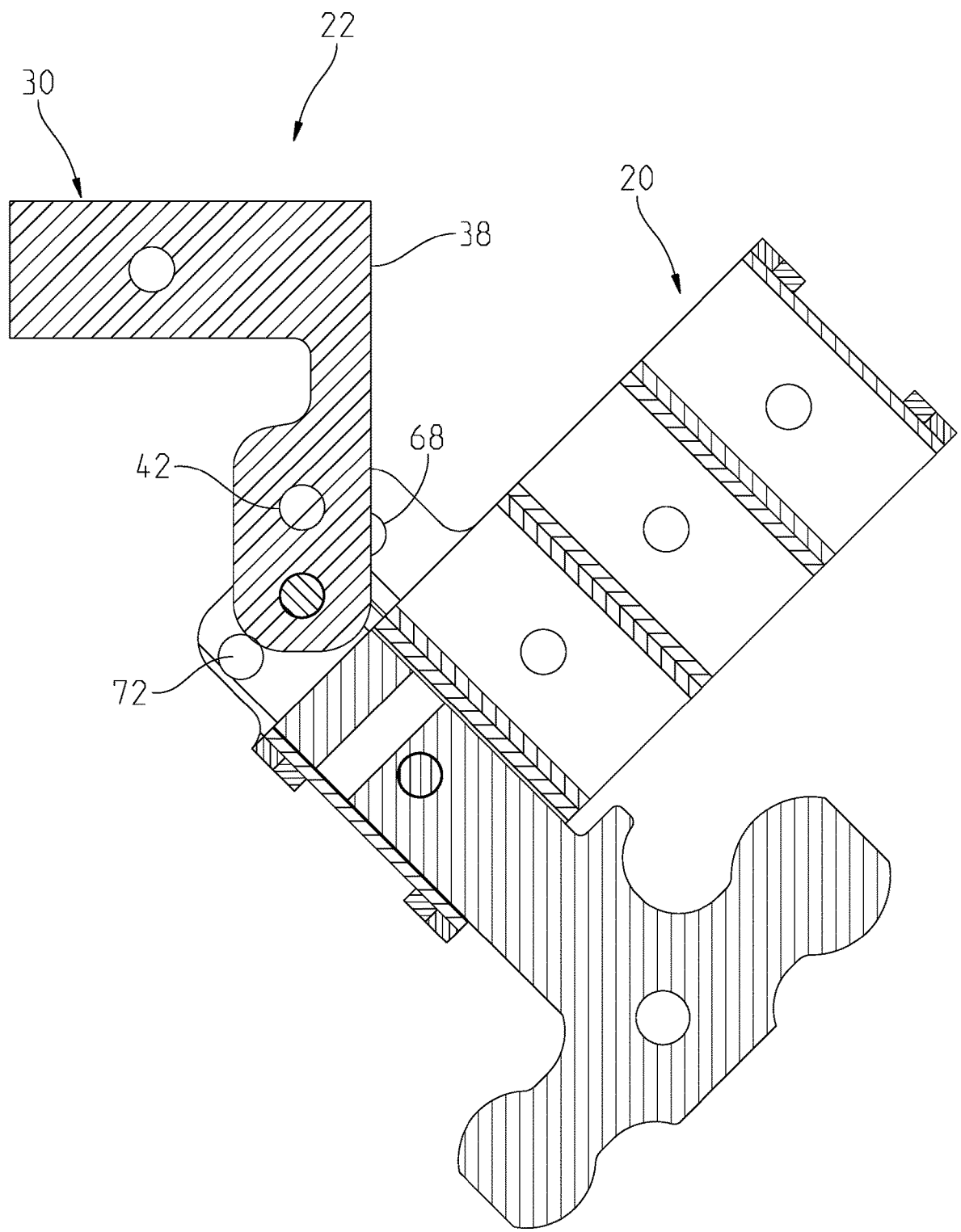
FIG. 7 is a side section view of the stacked hitch in FIG. 6 at a point between the stowed and use positions.

The hideaway stacked hitch 10 has two main portions, a stationary drawbar 22 and a stowable stacked receiver 20. The stacked receiver 20 is attached to the drawbar 22 through a bolt 24 which allows it to pivot between a use position as shown in FIGS. 1-2 and 6, and a stowed position as shown in FIGS. 3-4. The use position allows the user to tow or carry a trailer or other device behind the vehicle and the stowed position allows the stacked receiver to be out of the way. It is contemplated that the bolt 24 is a pin similar to pin 14.

The stationary drawbar 22 is designed to fit and be secured to a towing vehicle (not shown) through the drawbar portion 30 and hole 32. The drawbar portion 30 and hole 32 are well-known standards in the art to allow it to be secured to the vehicle. As shown, the stationary drawbar 22 is a solid piece of material, but it is contemplated that it is hollow, has hollow portions, or is formed from an assembly of components. The drawbar 22 has a drop-down portion 36 which extends from one side of the drawbar portion 30. The drop-down portion 36 has a flat surface 38 that extends to the drawbar portion 30. As shown, the flat surface 38 is perpendicular to the drawbar 22. The drop-down portion 36 has two transverse holes, with one of them being a locking hole 42 and another being a pivoting hole 40. The pivoting hole 40 receives the bolt 24 to attach the stacked receiver 20 and allow it to pivot about a pivot axis 44. The pivot axis 44 is spaced from and perpendicular to the drawbar portion 30, but it is contemplated that it is perpendicular to the drawbar but extends through the drawbar portion 30. The locking hole 42 is used to secure the stacked receiver 20 in either the stowed or use position.

The stacked receiver 20 is shown as an assembly of components secured together, typically through welding. It is contemplated that the stacked receiver 20 is formed from casting, machined from a single component, or other manufacturing process. As shown, the stacked receiver 20 has four possible locations to attach the removable drawbar 12, but it is contemplated that the stacked receiver 20 has more or less possible receiver locations than what is shown. The stacked receiver 20 has a front surface 50 and back surface 52 that is parallel to the front surface 50. The back surface 52 is located on the back side of the stacked receiver 20, with the front surface 50 located on the front side. In the use position, the back surface 52 is parallel to and close to the flat surface 38. This is shown in FIG. 6. In the stowed position, the back surface 52 is located on the opposite side of the bolt 24 (and pivot axis 44) from the flat surface 38. As shown in FIG. 4, there is a gap 74 between the draw bar 30 and the bottom surface 76 of the stacked receiver 20 to account for the towing vehicle's receiver (not shown). The top surface 78 and the bottom surface 76 on the stacked receiver 20 are merely for reference and do not define direction or orientation. As previously described, there are four receivers 54, 56, 58, 60, each with a transverse hole 55, 57, 59, 61. The transverse holes can receive the pin 14 to secure the removable drawbar 12 to one of the receivers. Extending beyond the back surface 52 are parallel flanges 62, 64 that capture the drop-down portion 36, shown in FIG. 2. The parallel flanges 62, 64 have a pivot hole 66 that receives the bolt 24. The bolt 24 may be removed if needed for cleaning or repair, but it is not intended to be removed during regular use. The bolt 24 acts as the pivot point for the stacked receiver 20 to rotate on its pivot axis 44. A use hole 68 aligns with the locking hole 42 when the stacked receiver 20 is pivoted to the use position. This allows a locking pin 70 to be inserted to secure the stacked receiver 20 in the use position. This is shown in FIGS. 1-2 and 6. A storage hole 72 is located on the opposite side of the pivot hole 66 which aligns with the locking hole 42 when the stacked receiver 20 is in the stowed position. This allows the locking pin 70 to be inserted to secure the stacked receiver 20 in the stowed position. This is shown in FIGS. 3-4.

Figure 8:
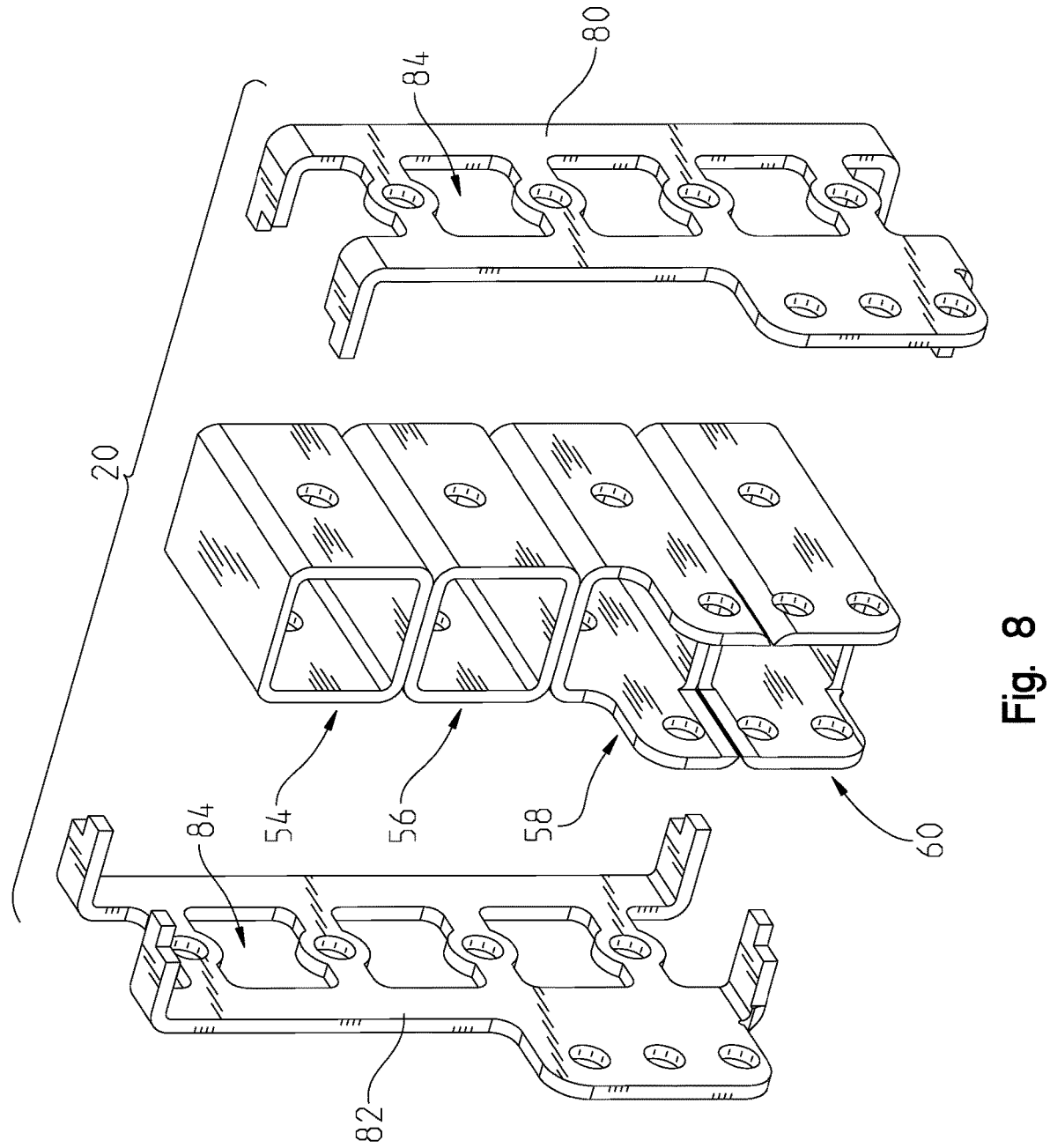
FIG. 8 is a partially exploded rear isometric view of the stacked receiver portion.

The stacked receiver 20 is shown partially exploded in FIG. 8. It is assembled with sides 80, 82 and individual receivers 54, 56, 58, 60. The sides and receivers are all secured together, typically with welding. As can be seen in FIG. 8, the lower two receivers 58, 60 extend beyond the back surface 52 to match the profile of the parallel flanges 62, 64. The sides have apertures 84 to allow access to weld receivers together and the sides 80, 82 to the receivers. When all components are welded together, this increases the strength of the receiver 20. As assembled, the parallel flanges 62, 64 include the sides 80, 82 and lower receivers 58, 60.

In the stowed position, the top receiver 54 is located above the drawbar portion 30 and the second receiver 56 is nearly aligned with it. The bottom two receivers 58, 60 are located below the drawbar portion 30. This gives the user options if they want the removable drawbar 12 to be higher, aligned, or lower than the vehicle's receiver. It is contemplated that the drop-down portion 36 is either closer or farther away from the drawbar portion 30 to vertically locate the receivers 54, 56, 58, 60 differently than what is shown.

While not shown, in the stowed position, at least one of the receivers could receive the removable drawbar 12 on the back side, otherwise defined as the side closest to the back surface 52. For example, as seen in FIG. 4, receivers 54 and 56 are symmetrical about their transverse holes 55, 57 and could receive the removable drawbar 12 when the stacked receiver 20 is in the stowed position. This provides additional storage locations in the event the removable drawbar 12 would interfere with vehicle components if left in place in its corresponding receiver when the stacked receiver 20 is moved to the stowed position. With a removable drawbar 12 in one of the available receivers 54, 56, it is contemplated that the stacked receiver 20 could be used in the stowed position for towing.

It is contemplated that the parallel flanges 62, 64 are wider than what is shown in the FIGS. This may be the case for heavy-duty applications where the use position creates excessive forces on the locking pin. By moving the locking pin farther from the pivot axis 44 or adding an additional locking pin, the forces may be reduced. In this case, the use hole 68 could be aligned with a locking hole that is located closer to or on the drawbar portion 30.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A stowable stacked receiver comprising:
a stationary drawbar having a drawbar portion to be secured to a vehicle-mounted receiver, said stationary drawbar having a drop-down portion affixed thereto, said drop-down portion having a locking hole and a pivoting hole parallel to said locking hole, said stationary drawbar having a flat surface extending perpendicularly from said drawbar portion to said drop-down portion;
a stacked receiver formed from a plurality of receivers and sides, said stacked receiver having parallel flanges extending therefrom, said parallel flanges having a use hole, a storage hole, and a pivot hole, said pivot hole located between said storage and use holes, said sides affixed to said receivers, said receivers and said sides aligned to form a front surface, said stacked receiver having a back surface parallel to and located opposite from said front surface, said parallel flanges extending beyond said back surface;
said stacked receiver pivotable with respect to said stationary drawbar on a fastener extending through said pivot hole on said stacked receiver and said pivoting hole on said drop-down portion, said drop-down portion held between said parallel flanges;
a removable locking pin;
said stacked receiver movable about a pivot axis through said fastener between a use position and a stowed position, said use position defined by said receivers adjacent to and partially obscuring said flat surface and said locking pin extending through said use hole and said locking hole, said stowed position defined by said locking pin extending through said storage hole and said locking hole.

2. The stowable stacked receiver in claim 1, wherein said stacked receiver in said stowed position is inverted with respect to said receiver in said use position.

3. The stowable stacked receiver in claim 1, wherein a portion of at least one of said receivers extends beyond said back surface and is integrated with said parallel flanges.

4. The stowable stacked receiver in claim 1, wherein said back surface is adjacent said flat surface in said stowed position.

5. The stowable stacked receiver in claim 1, wherein at least one of said receivers can receive a removable drawbar on a back side when said stacked receiver is in said stowed position.

6. A stowable stacked receiver comprising:
a stationary drawbar having a drawbar portion to be secured to a vehicle-mounted receiver, said stationary drawbar having a drop-down portion affixed thereto, said drop-down portion having a locking hole and a pivoting hole, said stationary drawbar having a flat surface extending from said drawbar portion to said drop-down portion;
a stacked receiver having a plurality of receivers, and parallel flanges extending therefrom, said parallel flanges having a use hole, a storage hole, and a pivot hole, said pivot hole located between said storage and use holes;
said stacked receiver pivotable with respect to said stationary drawbar on a fastener extending through said pivot hole on said stacked receiver and said pivoting hole on said drop-down portion, said drop-down portion located between said parallel flanges;

a locking pin to be received by said locking hole;

said stacked receiver movable about a pivot axis between a use position and a stowed position, said use position defined by said receivers adjacent to and partially obscuring said flat surface and said locking pin extending through said use hole and said locking hole, said stowed position defined by said locking pin extending through said storage hole and said locking hole; and at least one of said receivers can receive a removable drawbar on a back side when said stacked receiver is in said stowed position.

7. The stowable stacked receiver in claim 6, wherein said stacked receiver in said stowed position is inverted with respect to said receiver in said use position.

8. The stowable stacked receiver in claim 6, wherein said stacked receiver is formed from sides and said plurality of receivers, said sides affixed to said receivers, said receivers and said sides aligned to form a front surface, said stacked receiver having a back surface parallel to and located opposite from said front surface, said parallel flanges extending beyond said back surface.

9. The stowable stacked receiver in claim 8, wherein at least one of said receivers extends beyond said back surface and is integrated with said parallel flanges.

10. The stowable stacked receiver in claim 8, wherein said back surface is adjacent said flat surface in said stowed position.

11. A stowable stacked receiver comprising:

a stationary drawbar having a drawbar portion to be secured to a vehicle-mounted receiver, said stationary drawbar having a drop-down portion, said drop-down portion having a locking hole;

a stacked receiver having a plurality of receivers;

said stacked receiver pivotable with respect to said stationary drawbar on a pivot axis extending through said stacked receiver and said drop-down portion, said drop-down portion located between a portion of said stacked receiver, said pivot axis perpendicular to said drawbar portion;

a locking pin;

said stacked receiver movable about said pivot axis between a use position and a stowed position; and at least one of said receivers can receive a removable drawbar on a back side when said stacked receiver is in said stowed position.

12. The stowable stacked receiver in claim 11, said stationary drawbar having a flat surface extending from said drawbar portion to said drop-down portion.

13. The stowable stacked receiver in claim 11, further comprising parallel flanges extending from said stacked receiver, said parallel flanges having a use hole, a storage hole, and a pivot hole, said pivot hole located between said storage and use holes.

14. The stowable stacked receiver in claim 11, wherein said stacked receiver in said stowed position is inverted with respect to said receiver in said use position.

15. The stowable stacked receiver in claim 11, wherein said stacked receiver is formed from sides affixed to said plurality of receivers, said receivers and said sides aligned to form a front surface, said stacked receiver having a back surface parallel to and located opposite from said front surface, said stacked receiver having parallel flanges extending beyond said back surface.

16. The stowable stacked receiver in claim 15, wherein at least one of said receivers extends beyond said back surface and is integrated with said parallel flanges.

17. The stowable stacked receiver in claim 15, wherein said drawbar has a flat surface, said back surface is adjacent said flat surface in said stowed position.

18. The stowable stacked receiver in claim 15, said use position defined by said receivers adjacent to and partially obscuring a flat surface on said drawbar and said locking pin extending through a use hole and said locking hole, said stowed position defined by said locking pin extending through a storage hole and said locking hole.

19. A stowable stacked receiver comprising:

a stationary drawbar having a drawbar portion to be secured to a vehicle-mounted receiver, said stationary drawbar having a drop-down portion, said drop-down portion having a locking hole;

a stacked receiver having a plurality of receivers;

said stacked receiver pivotable with respect to said stationary drawbar on a pivot axis extending through said stacked receiver and said drop-down portion, said drop-down portion located between a portion of said stacked receiver, said pivot axis perpendicular to said drawbar portion;

a locking pin;

said stacked receiver movable about said pivot axis between a use position and a stowed position;

said stacked receiver is formed from sides affixed to said plurality of receivers, said receivers and said sides aligned to form a front surface, said stacked receiver having a back surface parallel to and located opposite from said front surface, said stacked receiver having parallel flanges extending beyond said back surface;

said use position defined by said receivers adjacent to and partially obscuring a flat surface on said drawbar and said locking pin extending through said use hole and said locking hole, said stowed position defined by said locking pin extending through said storage hole and said locking hole.

20. The stowable stacked receiver in claim 19, wherein said flat surface extends from said drawbar portion to said drop-down portion.

21. The stowable stacked receiver in claim 19, further comprising parallel flanges extending from said stacked receiver, said parallel flanges having a use hole, a storage hole, and a pivot hole, said pivot hole located between said storage and use holes.

22. The stowable stacked receiver in claim 19, wherein said stacked receiver in said stowed position is inverted with respect to said receiver in said use position.

23. The stowable stacked receiver in claim 19, wherein at least one of said receivers extends beyond said back surface and is integrated with said parallel flanges.

24. The stowable stacked receiver in claim 19, wherein said back surface is adjacent said flat surface in said stowed position.

25. The stowable stacked receiver in claim 19, wherein at least one of said receivers can receive a removable drawbar on a back side when said stacked receiver is in said stowed position.

* * * * *